Figure 1:
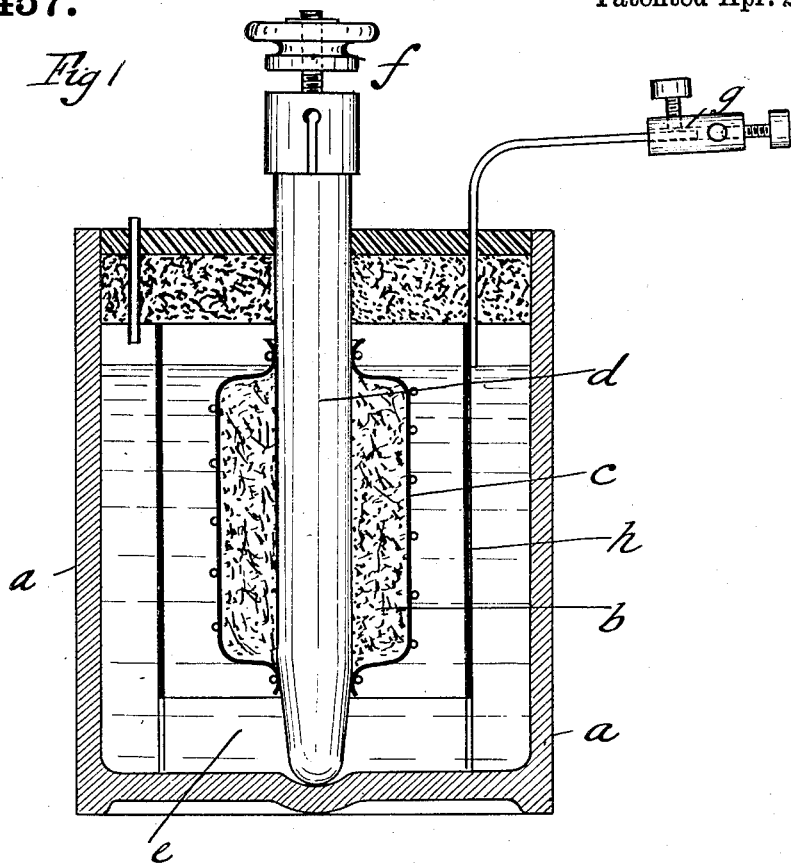

H. P. R. L. PÖRSCKE.
GALVANIC CELL.
APPLICATION FILED JULY 15, 1907.

919,457.

Patented Apr. 27, 1909.

Witnesses
A. J. Haddan
S. Ford

Inventor
Heinrich P. R. L. Pörscke
By R. Haddan
Attorney

UNITED STATES PATENT OFFICE.

HEINRICH PAUL RUDOLF LUDWIG PÖRSCKE, OF HAMBURG, GERMANY.

GALVANIC CELL.

No. 919,457.   Specification of Letters Patent.   Patented April 27, 1909.

Application filed July 15, 1907. Serial No. 383,937.

*To all whom it may concern:*

Be it known that I, HEINRICH PAUL RUDOLF LUDWIG PÖRSCKE, a subject of the German Emperor, residing at Hamburg, Germany, have invented certain new and useful Improvements in Galvanic Cells, of which the following is a specification.

This invention relates to improvements in galvanic cells containing chlorid of iron. Chlorid of iron is used as a depolarizer in certain galvanic cells, and the use of diaphragms or gypsum has been proposed for the purpose of preventing the diffusion of the chlorid to the negative electrode. Such diaphragms do not, however, retain their efficiency for any considerable length of time.

The present invention is based on the fact that a gelatinous mass is produced by mixing chlorid of iron with arabic acid, metarabic acid, or gums such as gum arabic containing acids of the arabin group.

For the purpose of the invention the positive electrode may be produced in the known manner, for example by mixing graphite and manganese peroxid in suitable proportions and moistening the mixture with a highly concentrated or more or less dilute solution of chlorid of iron. An improved method of producing the positive electrode consists in mixing and compressing carbon, manganese peroxid, ferrous hydrate, and chlorid of iron, the purpose of the hydrate in this mixture being to decompose the excess of hydrochloric acid which may be formed. A considerable proportion of chlorid of iron may be used, approximately one-third by weight of the entire mixture. A rod or cylinder of carbon is embedded in the mixture, and the positive electrode thus formed is placed in a suitable vessel, which may, for example, consist of zinc and be used as the negative electrode. The electrolyte introduced into this vessel may be a solution of chlorid of zinc, salammoniac, or magnesium chlorid, or a mixture of these three compounds in solution, but other suitable electrolytes may also be used. In each case the electrolyte is mixed with arabic acid or metarabic acid, for example by introducing thereinto gum arabic containing a considerable proportion of arabic acid, bone-meal or other absorbent material being added to the mixture to produce a pasty mass. The positive electrode is preferably wrapped in canvas or the like before being embedded in the electrolytic mass, the cell being thereupon sealed in the usual manner.

The cell produced in the manner described has on open circuit an electromotive force of approximately 2 or 2.1 volts, and during the discharge thereof the electromotive force is at all times approximately 0.4 or 0.5 volts higher than that of a cell of similar dimensions containing carbon and peroxid of manganese unmixed with chlorid of iron. In the improved cell the depolarization is more efficient than in cells in which the depolarizer is manganese peroxid alone, so that the discharge can take place with higher current-values. The diffusion of the chlorid of iron to the negative electrode is prevented by the presence of the arabic or metarabic acid, since the passage of a small quantity of the chlorid through the canvas wrapper of the positive electrode causes a conductive, gelatinous film or layer to be produced between the chlorid and the electrolyte, further diffusion of the chlorid being thus prevented.

Figure 2:
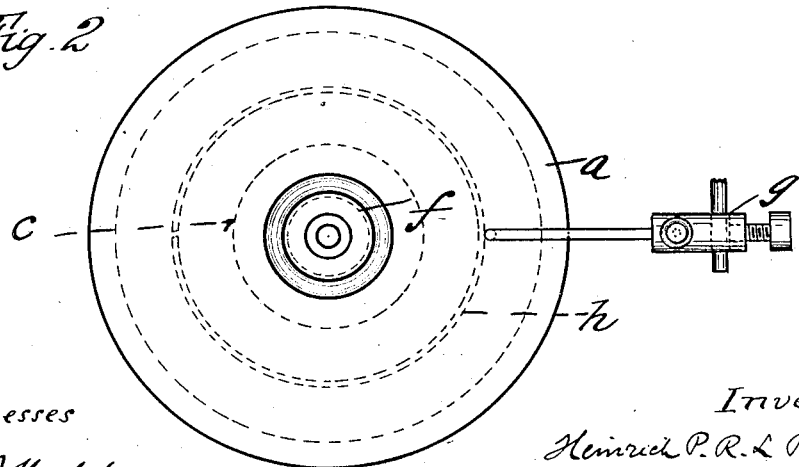

The annexed drawing shows an embodiment of the improved cell, Figure 1 being a vertical central section and Fig. 2 a plan view thereof.

*a* indicates the exterior vessel, *h* the negative electrode, *b* the positive electrode consisting of the constituents previously described and carried in a casing *c* and through which passes the carbon rod *d*.

*e* is the electrolyte with admixture of gum arabic and *f* and *g* the positive and negative terminals respectively.

What I claim as my invention and desire to secure by Letters Patent of the United States is:—

1. In a galvanic cell, the combination with a positive electrode and a negative electrode, of a depolarizing mixture containing chlorid of iron, an electrolyte and an admixture thereto of an acid of the arabin group.

2. In a galvanic cell the combination with a positive electrode and a negative electrode, of a depolarizing mixture containing chlorid of iron, an electrolyte, and an admixture thereto of a gum containing arabic and metarabic acids.

3. In a galvanic cell the combination with a positive electrode and a negative electrode of a depolarizing mixture containing graphite, manganese peroxid, chlorid of iron, and ferrous hydrate, an electrolyte and an admixture thereto of an acid of the arabin group.

4. In a galvanic cell the combination with a positive electrode and a negative electrode of a depolarizing mixture containing graphite, manganese peroxid, chlorid of iron, and ferrous hydrate, and electrolyte and an admixture thereto of a gum containing arabic and metarabic acids.

5. In a galvanic cell the combination with a positive electrode and a negative electrode, of a depolarizing mixture containing chlorid of iron, an electrolyte, an admixture thereto of an acid of the arabic group and a further admixture to said electrolyte of an absorbent material.

6. In a galvanic cell the combination with a positive electrode and a negative electrode, of a depolarizing mixture containing chlorid of iron, an electrolyte, an admixture thereto of a gum containing arabic and metarabic acids and a further admixture to said electrolyte of an absorbent material.

7. In a galvanic cell the combination with a positive electrode and a negative electrode, of a depolarizing mixture containing graphite, manganese peroxid, chlorid of iron, and ferrous hydrate, an electrolyte, an admixture thereto of an acid of the arabin group and a further admixture to said electrolyte of an absorbent material.

8. In a galvanic cell the combination with a positive electrode and a negative electrode, of a depolarizing mixture containing graphite, manganese peroxid, chlorid of iron, and ferrous hydrate, an electrolyte, an admixture thereto, of a gum containing arabic and metarabic acids and a further admixture to said electrolyte of an absorbent material.

In witness whereof I have signed this specification in the presence of two witnesses.

HEINRICH PAUL RUDOLF LUDWIG PÖRSCKE.

Witnesses:
SIEGFRIED STORCH,
OTTO W. HELLMRICH.